(12) United States Patent
Jung et al.

(10) Patent No.: US 10,147,392 B2
(45) Date of Patent: Dec. 4, 2018

(54) DISPLAY APPARATUS, CALIBRATION APPARATUS AND CALIBRATION METHOD THEREOF

(71) Applicant: SAMSUNG ELECTRONICS CO., LTD., Suwon-si (KR)

(72) Inventors: Kil-soo Jung, Osan-si (KR); Byung-chul Kim, Suwon-si (KR); Sung-yeol Kim, Suwon-si (KR); Jin-sung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/602,371

(22) Filed: May 23, 2017

(65) Prior Publication Data
US 2018/0144716 A1 May 24, 2018

(30) Foreign Application Priority Data

Nov. 23, 2016 (KR) ........................ 10-2016-0156670

(51) Int. Cl.
*G09G 5/10* (2006.01)
*G06T 7/90* (2017.01)
(Continued)

(52) U.S. Cl.
CPC ................. *G09G 5/10* (2013.01); *G06T 7/90* (2017.01); *G09G 3/2003* (2013.01); *G09G 3/32* (2013.01);
(Continued)

(58) Field of Classification Search
CPC ............... G09G 5/10; G09G 2300/026; G09G 2320/0233; G09G 2320/0242; G09G 2320/0693; G09G 1/6041; G09G 1/6044
See application file for complete search history.

(56) References Cited

U.S. PATENT DOCUMENTS 6,414,661 B1 7/2002 Shen et al.
8,791,932 B2 7/2014 Ueno et al.
(Continued)

FOREIGN PATENT DOCUMENTS

EP 0823691 A1 2/1998
JP 2009-133943 A 6/2009
(Continued)

OTHER PUBLICATIONS

Communication dated Feb. 13, 2018 by the International Searching Authority in counterpart International Patent Application No. PCT/KR2017/012357. (PCT/ISA/210).
(Continued)

*Primary Examiner* — Antonio A Caschera
(74) *Attorney, Agent, or Firm* — Sughrue Mion, PLLC

(57) ABSTRACT

A display apparatus includes a display including display modules, a storage configured to store a correction coefficient of each of light emitting pixels included in each of the display modules, and a processor configured to apply the correction coefficient of each of the light emitting pixels respectively to a pixel value of each of the light emitting pixels to correct the pixel value of each of the light emitting pixels. The correction coefficient of each of light emitting pixels is determined based on a first target value for uniformity between pixels, and the first target value is determined based on one or more representative pixel values of the display modules.

18 Claims, 20 Drawing Sheets

(51) Int. Cl.
*G09G 3/20* (2006.01)
*G09G 3/32* (2016.01)
*H04N 7/18* (2006.01)
*G09G 3/3208* (2016.01)

(52) U.S. Cl.
CPC ........... *G09G 3/3208* (2013.01); *H04N 7/183* (2013.01); *G06T 2207/10004* (2013.01); *G09G 2300/026* (2013.01); *G09G 2320/0233* (2013.01); *G09G 2320/0242* (2013.01); *G09G 2320/0295* (2013.01); *G09G 2320/0666* (2013.01); *G09G 2320/0693* (2013.01); *G09G 2360/145* (2013.01)

(56) References Cited

U.S. PATENT DOCUMENTS

| | | |
|---|---|---|
| 9,135,851 B2 | 9/2015 | Rykowski |
| 2006/0164348 A1 | 7/2006 | Ozawa et al. |
| 2009/0115801 A1 | 5/2009 | Jeon |
| 2011/0285763 A1 | 11/2011 | Bassi et al. |
| 2016/0027354 A1* | 1/2016 | Terai ........................ G09G 3/36 345/87 |

FOREIGN PATENT DOCUMENTS

| | | |
|---|---|---|
| JP | 4934963 B2 | 5/2012 |
| KR | 10-0902792 B1 | 6/2009 |
| KR | 10-0975025 B1 | 8/2010 |
| KR | 10-1374648 B1 | 3/2014 |
| KR | 10-1481803 B1 | 1/2015 |

OTHER PUBLICATIONS

Communication dated Feb. 13, 2018 by the International Searching Authority in counterpart International Patent Application No. PCT/KR2017/012357. (PCT/ISA/237).

* cited by examiner

| $P_1$ | $P_2$ | $P_3$ | $P_4$ | $P_5$ |
|---|---|---|---|---|
| $P_6$ | $P_7$ | $P_8$ | $P_9$ | $P_{10}$ |
| $P_{11}$ | $P_{12}$ | $P_{13}$ | $P_{14}$ | $P_{15}$ |
| $P_{16}$ | $P_{17}$ | $P_{18}$ | $P_{19}$ | $P_{20}$ |
| $P_{21}$ | $P_{22}$ | $P_{23}$ | $P_{24}$ | $P_{25}$ |

ACTUAL LUMINANCE VALUE FOR EACH PIXEL
(WHEN THERE IS NO INTERFERENCE)

$$M_i = P_i + \sum_{j=1}^{N} \alpha_{ij}$$

| $M_1$ | $M_2$ | $M_3$ | $M_4$ | $M_5$ |
|---|---|---|---|---|
| $M_6$ | $M_7$ | $M_8$ | $M_9$ | $M_{10}$ |
| $M_{11}$ | $M_{12}$ | $M_{13}$ | $M_{14}$ | $M_{15}$ |
| $M_{16}$ | $M_{17}$ | $M_{18}$ | $M_{19}$ | $M_{20}$ |
| $M_{21}$ | $M_{22}$ | $M_{23}$ | $M_{24}$ | $M_{25}$ |

LUMINANCE MEASUREMENT VALUE FOR EACH PIXEL
(WHEN THERE IS INTERFERENCE)

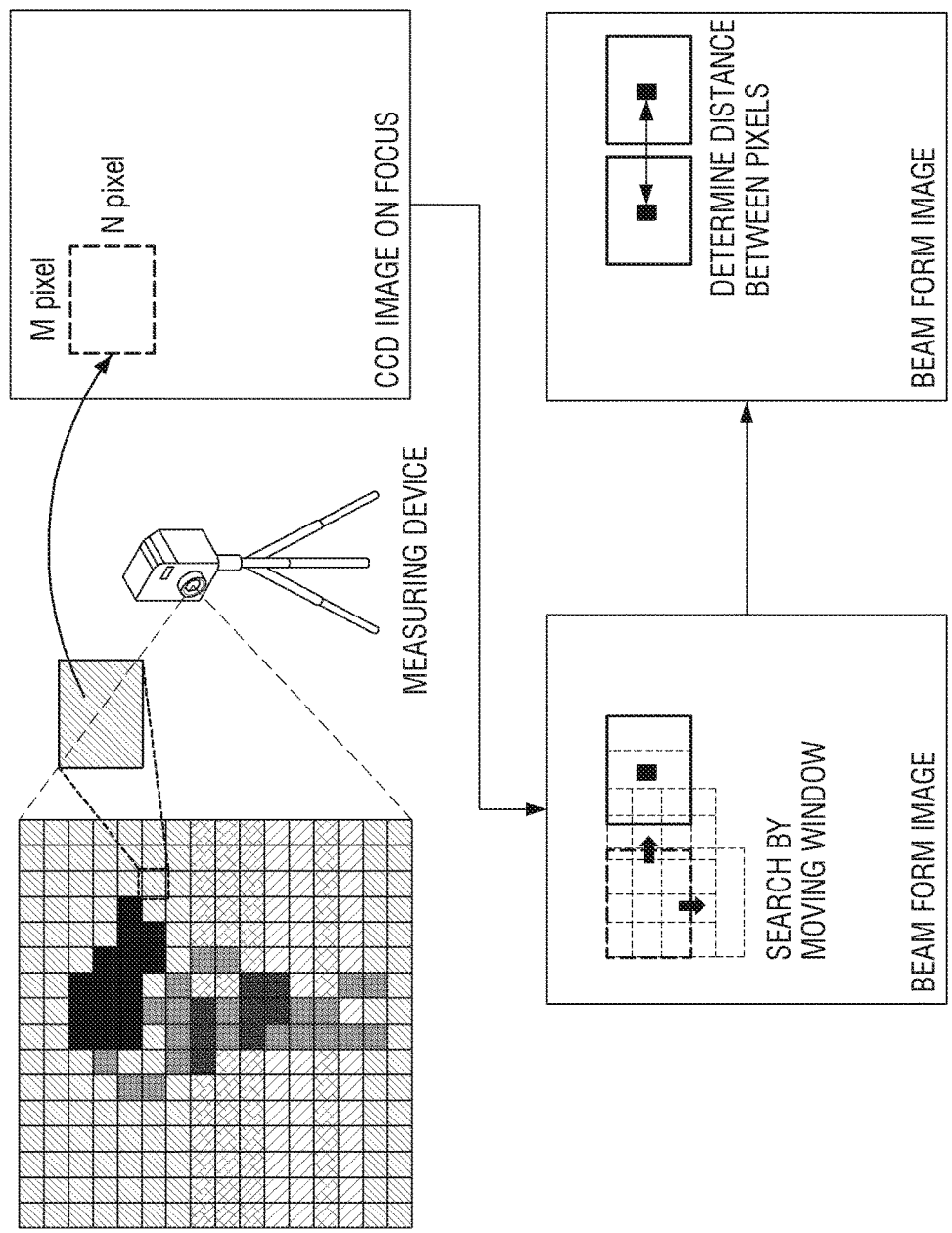

DISPLAY APPARATUS, CALIBRATION APPARATUS AND CALIBRATION METHOD THEREOF

CROSS-REFERENCE TO RELATED APPLICATION

This application claim priority from Korean Patent Application No. 10-2016-0156670, filed in the Korean Intellectual Property Office on Nov. 23, 2016, the disclosure of which is incorporated herein by reference in its entirety.

BACKGROUND

1. Field

Apparatuses and methods consistent with example embodiments relate to a display apparatus, a calibration apparatus and a calibration method thereof, and more particularly, to a display apparatus including a self-luminous element, a calibration apparatus and a calibration method thereof.

2. Description of Related Art

Light Emitting Diode (LED) is a semiconductor light emitting diode that converts current into light. Recently, LEDs have been increasingly used as display light sources, automotive light sources, and illumination light sources. Also, a light emitting diode that emits white light having excellent efficiency can be realized by using a fluorescent material or combining light emitting diodes of various colors.

Such a light emitting diode can be mass-produced in the form of a light emitting element package. The mass-produced light emitting element package is used as a light source by classifying the light emitting element package according to characteristics, such as luminous intensity, of each light emitting element package.

On the other hand, accurate measurement values for the individual elements are used for calculating the correction coefficient for each LED element. Accordingly, a measurement method for eliminating the interference of the adjacent elements by measuring the spacing of each LED element has been used. However, because the photographing is performed a plurality of times by the spacing interval for every individual LED measurement, there is a problem that a long time is used for the measurement.

In addition, even if the correction is performed by eliminating the interference between the LED elements through the spacing, the user recognizes the image in which the interference occurs, thereby causing color step differences. Such a color step difference occurs between a plurality of LED modules (or cabinets).

SUMMARY

Example embodiments may address at least the above problems and/or disadvantages and other disadvantages not described above. Also, the example embodiments are not required to overcome the disadvantages described above, and may not overcome any of the problems described above.

Example embodiments provide a calibration apparatus that simplifies a calibration method through modeling, a calibration method thereof, and a display apparatus capable of minimizing a color difference between display modules.

According to an aspect of an example embodiment, there is provided a display apparatus including a display including display modules, a storage configured to store a correction coefficient of each of light emitting pixels included in each of the display modules, a processor configured to apply the correction coefficient of each of the light emitting pixels respectively to a pixel value of each of the light emitting pixels to correct the pixel value of each of the light emitting pixels. The correction coefficient of each of light emitting pixels is determined based on a first target value for uniformity between pixels, and the first target value is determined based on one or more representative pixel values of the display modules.

The pixel value may represent either one or both of luminance and color.

The correction coefficient of each of the light emitting pixels may be determined by determining an actual pixel value of each of the light emitting pixels, based on a degree of interference between pixels that are modeled based on a photographed image of the display.

The correction coefficient of each of the light emitting pixels may be determined further by determining the correction coefficient so that the determined actual pixel value of each of the light emitting pixels to which the correction coefficient is applied has a second target value that is set for uniformity between pixels, and compensating the determined correction coefficient by the first target value.

The degree of interference between the modeled pixels may be determined based on a distance between a target pixel and an adjacent pixel, among the modeled pixels, and a peak pixel value among the target pixel and the adjacent pixel.

The degree of interference between the modeled pixels may be determined based on either one or both of a light distribution deviation between a target pixel and an adjacent pixel, among the modeled pixels, and an angle at which the target pixel and the adjacent pixel are disposed.

Each of the display modules may be a light emitting diode (LED) module including LED pixels, or an LED cabinet to which LED modules are connected.

According to an aspect of another example embodiment, there is provided a calibration method of a display including display modules, the method including determining a representative pixel value of each of the display modules, based on a photographed image of the display, determining a first target value, based on the determined representative pixel value of each of the display modules, and compensating a correction coefficient of each of light emitting pixels included in each of the display modules, based on the determined representative pixel value of each of the display modules and the determined first target value. The correction coefficient is determined based on a second target value for uniformity between pixels.

The method may further include determining a peak pixel value among a target pixel and an adjacent pixel, among pixels that are modeled based the photographed image, and a distance between the target pixel and the adjacent pixel, determining a degree of interference between the modeled pixels, based on the determined distance and the determined peak pixel value, determining an actual pixel value of the target pixel, based on the determined degree of interference, and determining the correction coefficient, based on the determined actual pixel value and the second target value.

The determining of the degree of interference may include determining the degree of interference between the modeled pixels, based on a light distribution deviation between the target pixel and the adjacent pixel.

The determining of the degree of interference may include determining the degree of interference between the modeled pixels, based on an angle at which the target pixel and the adjacent pixel are disposed.

The determining of the actual pixel value may include determining the actual pixel value of the target pixel not interfering with the adjacent pixel, based on the determined degree of interference and a pixel value of the target pixel that is measured from the photographed image, and the determining of the correction coefficient may include determining the correction coefficient so that the determined actual pixel value to which the correction coefficient is applied has the second target value.

Each of the display modules may be a light emitting diode (LED) module including LED pixels, or an LED cabinet to which LED modules are connected.

According to an aspect of another example embodiment, there is provided a calibration apparatus including a camera configured to photograph a display including display modules to generate a photographed image, a storage configured to store the photographed image, and a processor configured to determine a representative pixel value of each of the display modules, based on the photographed image, determine a first target value, based on the determined representative pixel value of each of the display modules, and compensate a correction coefficient of each of light emitting pixels included in each of the display modules, based on the determined representative pixel value of each of the display modules and the determined first target value. The correction coefficient is determined based on a second target value for uniformity between pixels.

The processor may be further configured to determine a peak pixel value among a target pixel and an adjacent pixel, among pixels that are modeled based the photographed image, and a distance between the target pixel and the adjacent pixel, determine a degree of interference between the modeled pixels, based on the determined distance and the determined peak pixel value, determine an actual pixel value of the target pixel, based on the determined degree of interference, and determine the correction coefficient, based on the determined actual pixel value and the second target value.

The processor may be further configured to determine the degree of interference between the modeled pixels, based on a light distribution deviation between the target pixel and the adjacent pixel.

The processor may be further configured to determine the degree of interference between the modeled pixels, based on an angle at which the target pixel and the adjacent pixel are disposed.

The processor may be further configured to determine the actual pixel value of the target pixel not interfering with the adjacent pixel, based on the determined degree of interference and a pixel value of the target value that is measured from the photographed image, and determine the correction coefficient so that the determined actual pixel value to which the correction coefficient is applied has the second target value.

Each of the display modules may be an LED module including LED pixels, or an LED cabinet to which LED modules are connected.

According to an aspect of another example embodiment, there is provided a calibration apparatus including a camera configured to photograph a display including display modules to generate a photographed image, and a processor configured to determine a representative pixel value of each of the display modules, based on the photographed image, determine a first target value, based on the determined representative pixel value of each of the display modules, and compensate a correction coefficient of a display module among the display modules to be applied to each of pixels included in the display module, with the determined representative pixel value of the display module and the determined first target value.

The processor may be further configured to determine a peak pixel value among a target pixel and an adjacent pixel, among the pixels included in the photographed image, and a distance between the target pixel and the adjacent pixel, determine a degree of interference between the pixels, based on the determined distance and the determined peak pixel value, determine an actual pixel value of the target pixel, based on the determined degree of interference and a pixel value of the target pixel that is measured from the photographed image, and determine the correction coefficient so that the determined actual pixel value to which the correction coefficient is applied has a second target value.

The determined first target value may be a minimum pixel value or a maximum pixel value among an average pixel value of each of the display modules.

BRIEF DESCRIPTION OF THE DRAWINGS

The above and other aspects of example embodiments will become more apparent by reference to the appended drawings. Understanding that these drawings depict only the example embodiments of the disclosure and are not therefore to be considered to be limiting of the scope of the disclosure, the principles herein are described and explained with additional specificity and detail through the use of the accompanying drawings, in which:

FIGS. 5, 6A, 6B, 6C, 6D, 7, 8A, 8B, 9A, 9B, 9C, 9D, and 10 are diagrams illustrating methods of calculating a correction coefficient according to example embodiments;

DETAILED DESCRIPTION

Figure 1:
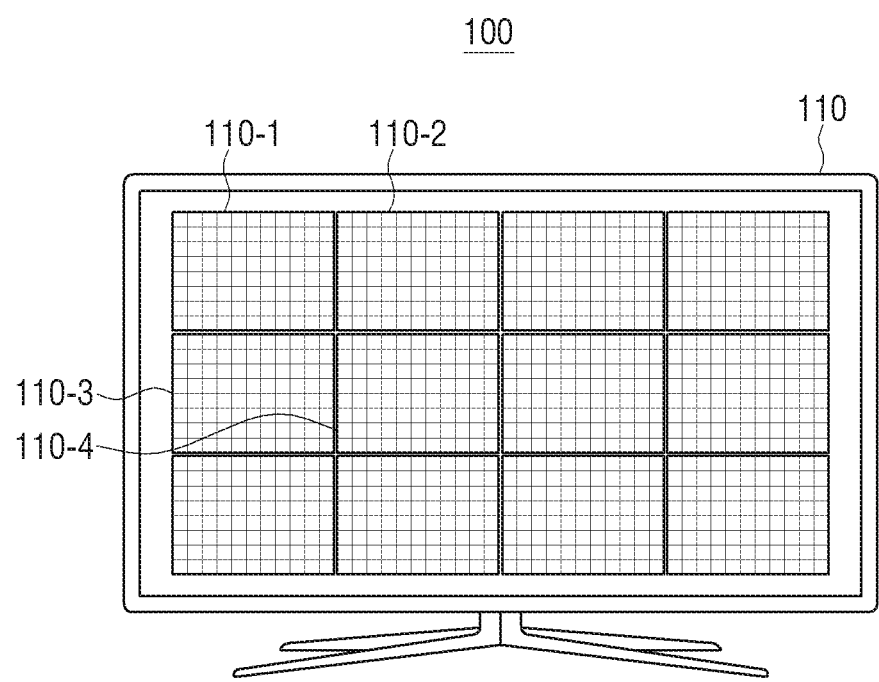
FIG. 1 is a diagram illustrating a configuration of a display apparatus according to an example embodiment.

Below, example embodiments will be described in detail with reference to the accompanying drawings. For reference, when it is determined that the detailed description of the known function or configuration may obscure the gist of the example embodiments in describing them, the detailed description thereof will be omitted. In addition, the example embodiments may be changed in various forms, and therefore, the technical scope is not limited to the following example embodiments. Rather, these example embodiments are provided to make the present disclosure thorough and complete.

Unless explicitly described otherwise, the term 'including' will be understood to imply the inclusion of a component, but not the exclusion of any other components. Further, various elements and areas in the drawings are schematically drawn. Therefore, the technical ideas are not limited by a relative size or interval drawn in the accompanying drawings.

FIG. 1 is a diagram illustrating a configuration of a display apparatus according to an example embodiment.

According to the illustration in FIG. 1, a display apparatus 100 according to an example embodiment of the present disclosure may be realized in the form that a plurality of display modules 110-1, 110-2, 110-3, 110-4, . . . , 110-n are physically connected to each other. In this case, each of the plurality of display modules may include a number of pixels arranged in a matrix form, for example, self-luminous pixels. The display apparatus module may be implemented as a LED module in which each of a number of pixels is realized as a LED pixel, or a LED cabinet in which a plurality of LED modules are connected to each other, but the example is not limited thereto. For example, the display module may be realized as a liquid crystal display (LCD), an organic LED (OLED), an active-matrix OLED (AMOLED), a Plasma Display Panel (PDP), and the like. However, hereinafter, it will be described such that each display module is realized as an LED module or an LED cabinet for the convenience of explanation.

When a display 110 is configured by using the unit display module, various sizes and/or shapes of the display 110 can be realized. However, there is a color step between the LED areas (for example, LED modules or LED cabinets).

Hereinafter, example embodiments of the present disclosure for solving the color step will be described.

Figure 2:
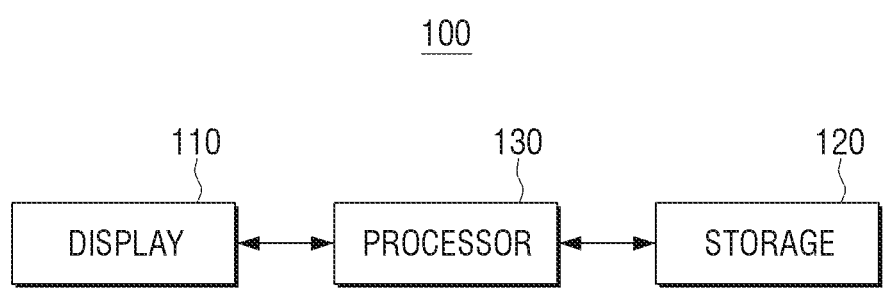
FIG. 2 is a block diagram illustrating a display apparatus according to an example embodiment.

FIG. 2 is a block diagram illustrating a display apparatus according to an example embodiment.

Referring to FIG. 2, the display apparatus 100 includes the display 110, a storage 120, and a processor 130.

The display apparatus 110 includes a plurality of display modules. The display 110 may be configured in the form that a plurality of display modules are connected and assembled. In this case, each of the plurality of display modules may include a number of pixels arranged in a matrix form, for example, self-luminous pixels. According to an example embodiment, the display 110 may be realized as a plurality of LED modules (LED module including at least one LED element) and/or a plurality of LED cabinets. In addition, the LED module may include a plurality of LED pixels. For example, the LED pixel may be realized as an RGB LED, and the RGB LED may also include an red LED, a green LED, and a blue LED.

The storage 120 stores various data used for an operation of the display apparatus 100.

The storage 120 may be realized as a nonvolatile memory, a volatile memory, a hard disk drive (HDD) or solid state drive (SSD), a memory card (e.g., micro SD card, USB memory, etc.), an external memory (for example, a USB memory, etc.) connectable to an external input port, and the like.

The storage 130 may store information of a binning group, information of a maximum luminance per pixel, information of a color per pixel, and the like. In this case, the binning group may be a group of LED pixels having the same characteristics (luminance, color, color coordinate, etc.).

The storage 120 may store a correction coefficient corresponding to at least one light emitting pixel included in any one or any combination of a plurality of display modules.

In an example embodiment, the storage 120 may store a correction coefficient corresponding to each of the light emitting pixels included in a plurality of display modules. Here, the correction coefficient may be a correction coefficient for causing the pixel value of each light emitting pixel to have a uniformity. In this case, the pixel value may include either one or both of luminance (or intensity) and color (or color sense or color temperature).

For example, in the case in which a light emitting pixel is implemented as a self-luminous pixel such as an LED pixel, to match the maximum luminance to the target luminance of the uniformity characteristic between a plurality of LED pixels, the luminance is adjusted down through calibration using a correction coefficient.

Figure 3:
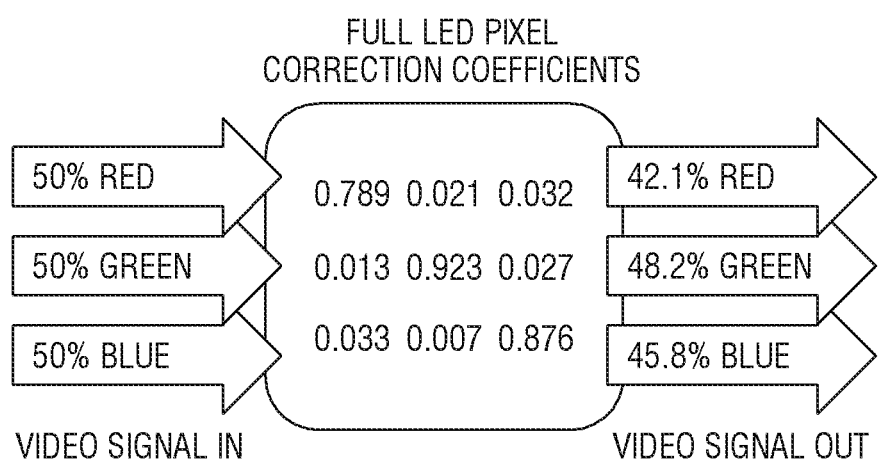
FIG. 3 is a diagram illustrating a correction coefficient according to an example embodiment.

FIG. 3 is a diagram illustrating a correction coefficient according to an example embodiment. As illustrated in FIG. 3, the correction coefficient may be in a 3×3 matrix form to realize the target R/G/B luminance, and it is possible to implement uniformity by applying different correction coefficients to each pixel so that the maximum luminance becomes the target luminance. In addition, the target luminance may be implemented based on parameters in a 3×3 matrix form corresponding to each of the R/G/B device, and a color temperature may be also calibrated to have color (or color sense or color temperature) or uniformity.

The correction coefficient may be a correction coefficient generated by calculating a pixel value of each pixel, based on the degree of interference between pixels modeled based on a captured image of the display 110, and generated such that a pixel value of each pixel implements a first target value. Here, the first target value may be a target value to eliminate a color step.

The correction coefficient may be a coefficient generated by calculating a first correction coefficient for a pixel value of each pixel to have a second target value set for uniformity and then compensating the first correction coefficient to have the first target value to eliminate a color step.

In this case, the first correction coefficient may be a correction coefficient acquired by modeling the degree of interference between pixels according to a peak pixel value of a pixel acquired based on a photographed image and a distance between pixels.

The first correction coefficient may be a correction coefficient acquired by modeling the degree of interference between pixels according to either one or both of light distribution deviation of pixels acquired based on a photographed image and a disposition angle of pixels.

However, it will be assumed that a correction coefficient corrects luminance for the convenience of explanation. However, the same method may be applied to the case in which a correction coefficient corrects color.

Referring again to FIG. 2, the first correction coefficient may be a correction coefficient acquired by calculating a modeling-based correction coefficient based on the degree of luminance interference between pixels modeled based on a photographed image of the display 110, and compensating the modeling-based correction coefficient such that each pixel implements a target luminance value. Here, the interference factor that affects the degree of luminance interference may include any one or any combination of a distance between pixels, a peak luminance of pixel, a luminance distribution deviation of pixels, and a disposition angle of pixels.

Accordingly, the modeling-based correction coefficient may be a correction coefficient acquired by modeling the degree of luminance interference between pixels according to any one or any combination of a distance between pixels, a peak luminance of pixels, a luminance distribution deviation of pixels and a disposition angle of pixels.

The target luminance may be determined based on an LED pixel having the lowest luminance, but the example is not limited thereto. For example, a luminance value having about 90% of the LED pixel of the lowest luminance may be determined as a target luminance value.

In addition, the target luminance may be determined based on the representative luminance of each of a plurality of display modules 110-1, 110-2, ..., 110-n. Here, the representative luminance may be an average luminance of the respective display modules, but the example is not limited thereto. For example, the representative luminance may also be the maximum luminance of the respective display modules.

In addition, the storage 120 may also store information of the number of pixels included in each of a plurality of display modules, the size of pixels, and an interval between pixels. For example, the storage 120 may store information indicating that an LED module includes M*N number of pixels, that pixels have a size of 2.1 mm, and that a distance between centers of pixels is 2.5 mm.

The processor 130 controls overall operations of the display apparatus 100. The processor 130 may include one or more of a central processing unit (CPU), controller, application processor (AP), communication processor (CP), ARM processor, or the like.

In addition, the processor 130 may include a graphic processor to perform graphic processing corresponding to the image. The processor 130 may be implemented as a system on chip (SoC) including a core and a GPU. The processor 130 may include a single core, dual core, triple core, quad core, and multiples of cores.

According to an example embodiment of the present disclosure, the processor 130 may correct a pixel value, that is, either one or both of luminance and color, by applying the correction coefficient acquired from the storage 120 to each of the corresponding light emitting pixels.

Figure 4A:
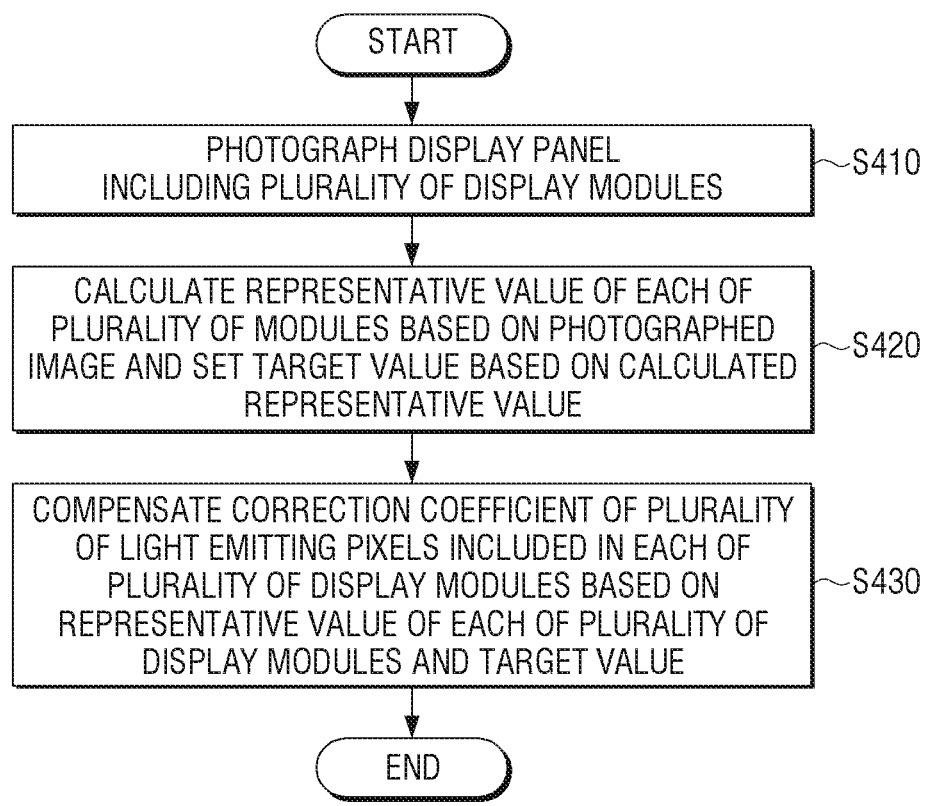
FIG. 4A is a flowchart illustrating a method of calculating a correction coefficient of a light emitting pixel according to an example embodiment.
Figure 4B:
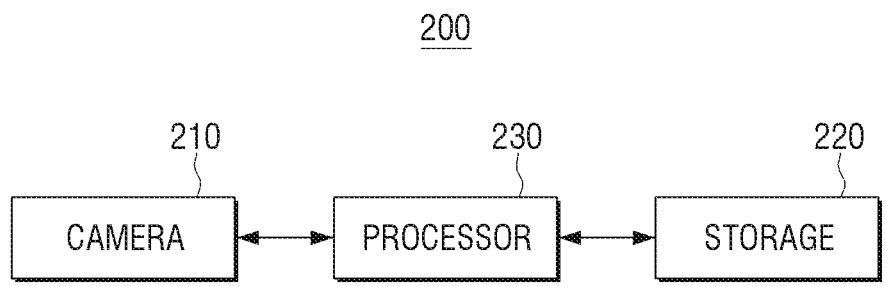
FIG. 4B is a block diagram illustrating a calibration apparatus according to an example embodiment.

FIG. 4A is a flowchart illustrating a method of calculating a correction coefficient of a light emitting pixel according to an example embodiment. FIG. 4B is a block diagram illustrating a calibration apparatus according to an example embodiment.

For example, the correction coefficient calculation method of FIG. 4A may be applied to a calibration apparatus. For example, as illustrated in FIG. 4B, a calibration apparatus 200 includes a camera 210, a storage 220, and a processor 230. However, according to another example embodiment of the present disclosure, either one or both of the camera 210 and the storage 220 may be implemented as separate from the calibration apparatus 200. For example, the calibration apparatus 200 may receive a photographed image from a camera apparatus and perform a calibrating operation. However, hereinafter, it will be described such that the calibration apparatus 200 includes the camera 210, the storage 220, and the processor 230 for the convenience of explanation.

Referring to FIG. 4A, in operation S410, the camera 210 photographs a display panel including a plurality of display modules. In this case, one photographing may be performed in a state that all LEDs included in the display panel emit light. However, the example is not limited thereto, and a predetermined threshold number of photographing may also be performed in a state that light is emitted from at least a predetermined threshold number of LEDs possible within the range that the number of photographing may be reduced.

Here, the camera 210 may be implemented as a CMOS image sensor, a CCD image sensor, and the like.

In addition, the photographed images may be stored in the storage 220.

In addition, the storage 120 may also store information of the number of pixels included in each of a plurality of display modules, the size of pixels, and an interval between pixels. For example, the storage 120 may store information indicating that an LED module includes M*N number of pixels, that pixels have a size of 2.1 mm, and that a distance between centers of pixels is 2.5 mm.

In operation S420, the processor 230 calculates a representative value of each of a plurality of display modules, based on a photographed image, and sets a first target value, based on the calculated representative value. For example, the processor 230 may calculate an average pixel value of each of the plurality of display modules, and set a first target value, based on a minimum value among the calculated average pixel values. However, the representative value may be the maximum pixel value, the minimum pixel value, and the like, other than the average pixel value. In addition, the first target value may also be an arbitrary value excluding the minimum value among the representative values.

In operation S430, the processor 230 compensates a correction coefficient of a plurality of light emitting pixels included in each of the plurality of display modules, based on the representative value of each of the plurality of display modules and the first target value. Here, the correction coefficient may be a correction coefficient calculated such that each pixel has a predetermined second target value for uniformity between pixels.

The processor 230 may calculate peak pixel values of a target pixel and at least one adjacent pixel, based on the photographed image, and a distance between the target pixel and the at least one adjacent pixel, and model the degree of interference between pixels, based on the peak pixel values and the distance between pixels.

In addition, the processor 230 may calculate a pixel value of the target pixel, based on the modeled interference degree, and calculate a correction coefficient, based on the calculated pixel value.

In this case, the processor 230 may model the degree of interference between pixels, based on a light distribution deviation of the target pixel and at least one adjacent pixel.

In this case, the processor 230 may model the degree of interference between pixels, based on the angle of disposition of the target pixel and the at least one adjacent pixel.

In addition, the processor 230 may calculate a pixel value of a target pixel that does not interfere with at least one adjacent pixel, based on the measured pixel value of the target pixel and the modeled interference degree, and calculate a correction coefficient to have a second target value, based on the pixel value.

The correction coefficient according to an example embodiment of the present disclosure may be a coefficient to correct at least one of a pixel value, that is, either one or both of a luminance value and a color value. However, hereinafter, it is assumed that the luminance value is corrected for the convenience of explanation.

A correction coefficient of an LED device according to an example embodiment of the present disclosure may be calculated in the methods as follows.

FIGS. 5, 6, 7, 8, 9, and 10 are diagrams illustrating methods of calculating a correction coefficient according to example embodiments.

Figure 5:
Figure 5:
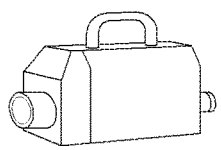
Figure 5:
Figure 5:
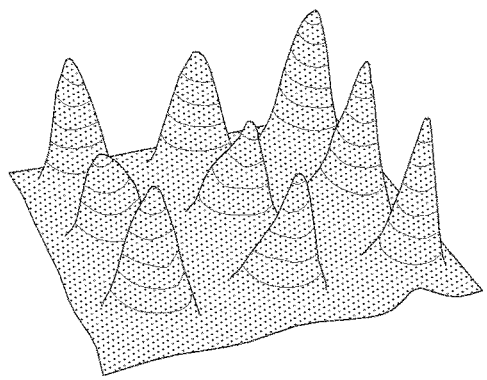

Referring to FIG. 5, when photographing is performed in the state that all LEDs included in the display panel emit light, a luminance value for each pixel measured through the photographed image is different from an actual luminance value. In other words, when an actual luminance value of a pixel calculated through a related-art spacing method is Pi (P1 to P25), a luminance value of a pixel acquired through a photographed image photographed when all LEDs emit light may be Mi (M1 to M25) due to interference from luminance of adjacent pixels. Here, assuming that the degree of interference that j-th pixel has on i-th pixel is $a_{i,j}$, $M_i$ may be expressed as Equation 1 as follows.

$$M_i = P_i + \sum_{j=1}^{N} \alpha_{ij} \quad \text{[Mathematical formula 1]}$$

Accordingly, the actual luminance value of each pixel may be calculated by Equation 2 as shown below, according to an example embodiment of the present disclosure.

$$P_i = M_i - \sum_{j=1}^{N} \alpha_{ij} \quad \text{[Mathematical formula 2]}$$

In this case, the interference factor that affects the degree of interference may include any one or any combination of a distance between pixels, a peak luminance of pixel, a luminance distribution deviation of pixels, and an angle at which pixels are disposed.

Accordingly, peak luminance values of a target light emitting pixel and at least one adjacent pixel and a distance between the target pixel and the at least one adjacent pixel are calculated based on a photographed image photographed at the operation S410. Thereafter, the degree of interference between pixels is modeled based on a distance between the peak luminance values and the distance between pixels.

In this case, the degree of interference between pixels may be modeled based on a luminance distribution deviation between the target pixel and the at least one adjacent pixel.

In addition, the degree of luminance interference between pixels may be modeled based on a degree at which the target pixel and the at least one adjacent pixel are disposed.

Thereafter, a correction coefficient of a target pixel is calculated based on a luminance measurement value of the target pixel, based on the photographed image and the modeled luminance interference degree.

An original luminance of a target pixel that does not interfere with at least one adjacent pixel may be calculated based on the luminance measurement value of the target pixel and the modeled luminance interference degree. Thereafter, a correction coefficient to implement the target luminance may be calculated based on the original luminance.

The correction coefficient calculated as above may be compensated such that a color step between the respective display modules in the above-mentioned operations S420 and S430 is reduced.

A modeling method of the degree of luminance interference according to an example embodiment of the present disclosure is as follows.

Figure 6A:
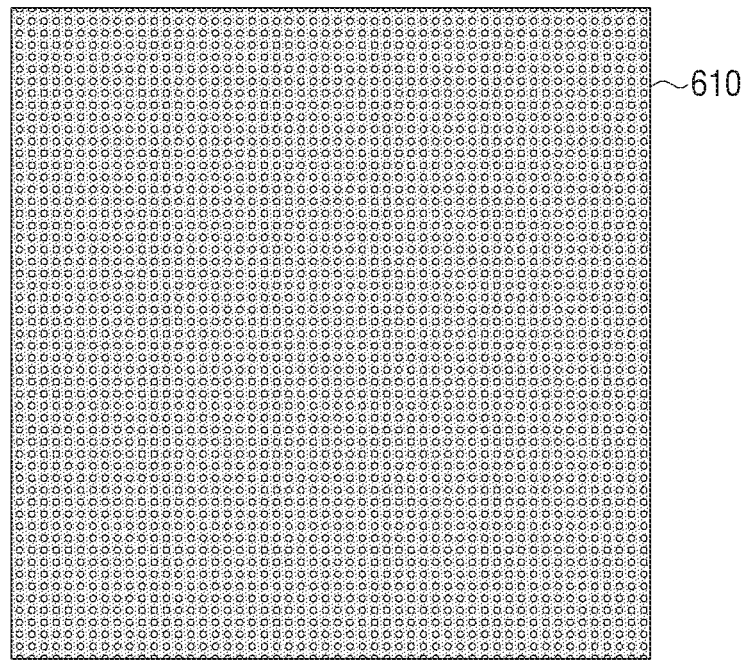

First, the processor 230 may derive a distance between pixels based on measurement data obtained from photographing the display 110 and information of the number of pixels within the module, a pixel size, an interval between pixels acquired from the storage 220. Here, the measurement data may be data obtained from photographing the display 110 in the state that each pixel area is displaying a sample image (for example, full white image) having the maximum gray level value, for example, 255 gray level value (in the case in which the image has 256 levels of gray level with respect to each color signal of RGB). FIG. 6A illustrates example measurement data 610.

Figure 6B:
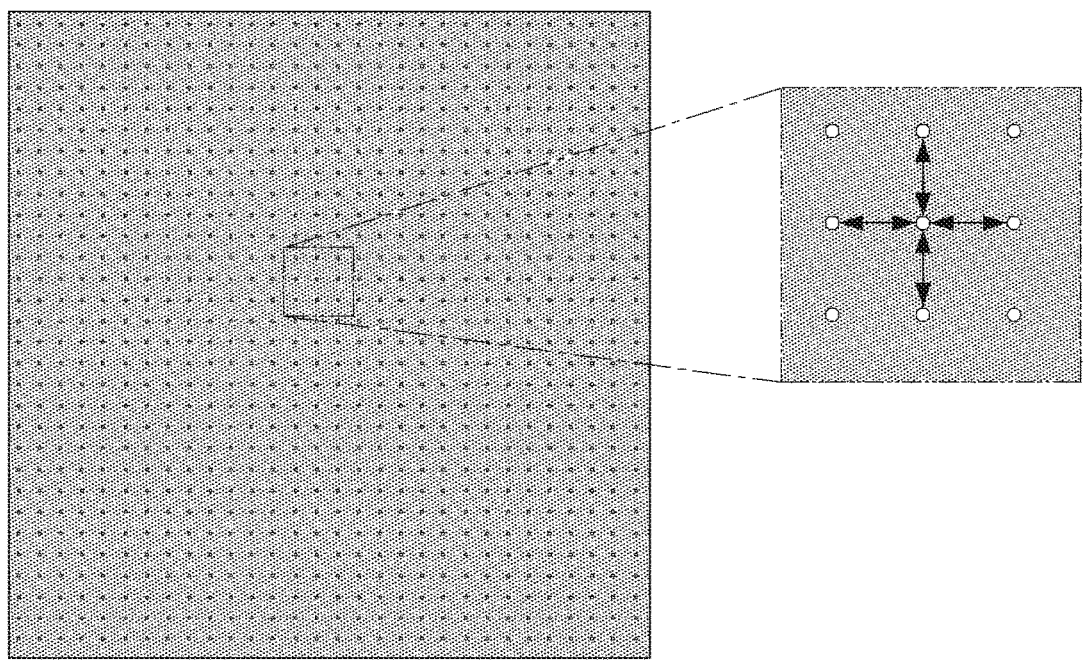
Figure 6C:
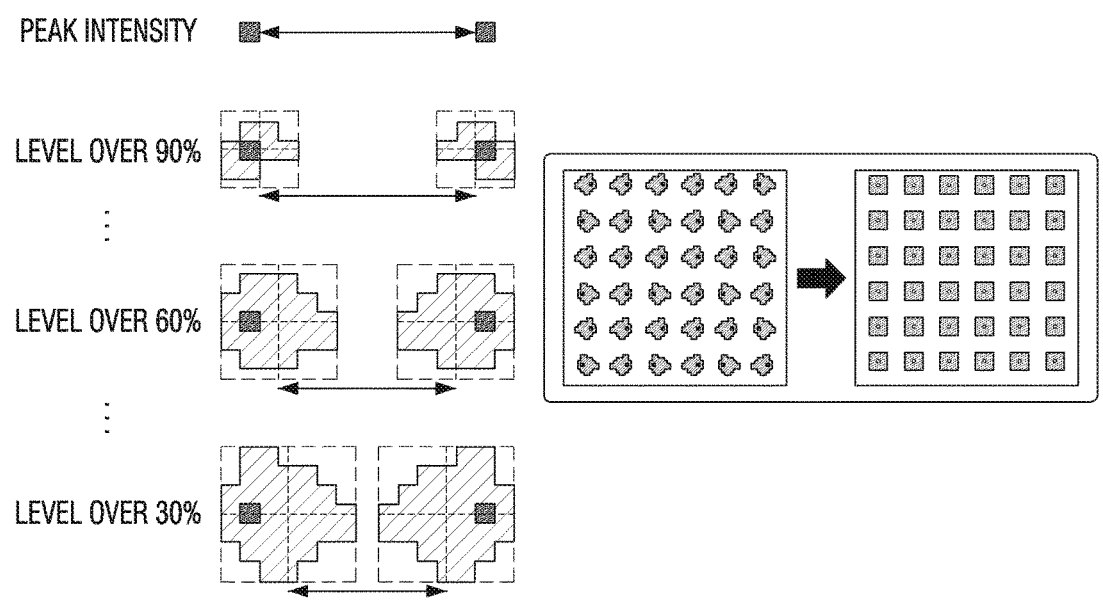

A peak intensity of each pixel area is derived as illustrated in FIG. 6B from the measurement data 610 as illustrated in FIG. 6A, and an estimated pixel area may be expanded by decreasing a luminance level based on the peak intensity as illustrated in FIG. 6C. In this case, a final estimated pixel area may be determined by expanding an estimated pixel area to the extent that the expanded estimated pixel area coincides a pixel size stored in the storage 120 without overlapping with each other, and thereby, an interval between pixels may be derived.

However, the example is not limited thereto, and an interval between pixels may be derived in other methods. For example, a focus of a measuring device may be adjusted before beam form measurement as illustrated in FIG. 6D, so that a physical size, not a light emitting form, of a display pixel is accurately measured. Thereby, the size of a CCD image, M×N, corresponding one pixel is derived. Next, a window of a size that is the same as a CCD size corresponding to one pixel, M×N, is defined. Thereafter, the defined window is moved upward/downward/left/right by a scan line to find a position where the average intensity in the window is the highest in a predetermined area defined by the user, and the center of the window is considered as the center of a pixel. A distance between centers of adjacent pixels is considered as an interval between pixels.

Thereafter, the processor 230 may model the degree of luminance interference between each pixel, based on the derived interval between pixels. Alternatively, the processor 230 may calculate the degree of luminance interference according to the derived interval between pixels, based on the modeled luminance interference degree.

Figure 7:
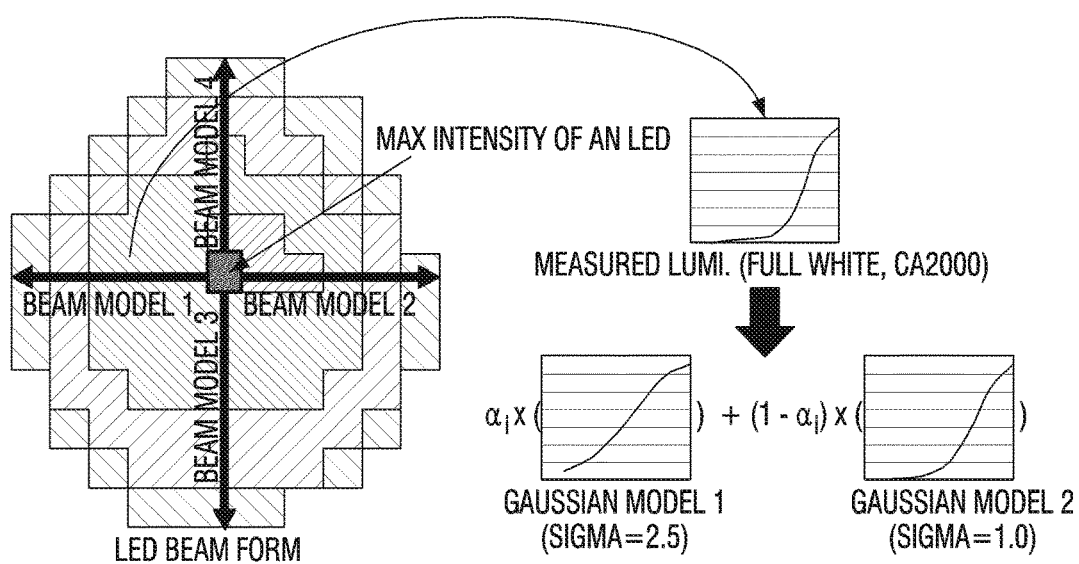

For example, the processor 230 may perform beam form modeling with respect to luminance distribution to estimate a luminance distribution of each pixel, based on the maximum gray level (for example, full white of 255 gray level). For example, a luminance distribution in the Gaussian function form corresponding to each pixel area may be derived through beam form modeling with respect to each pixel as illustrated in FIG. 7.

Figure 8A:
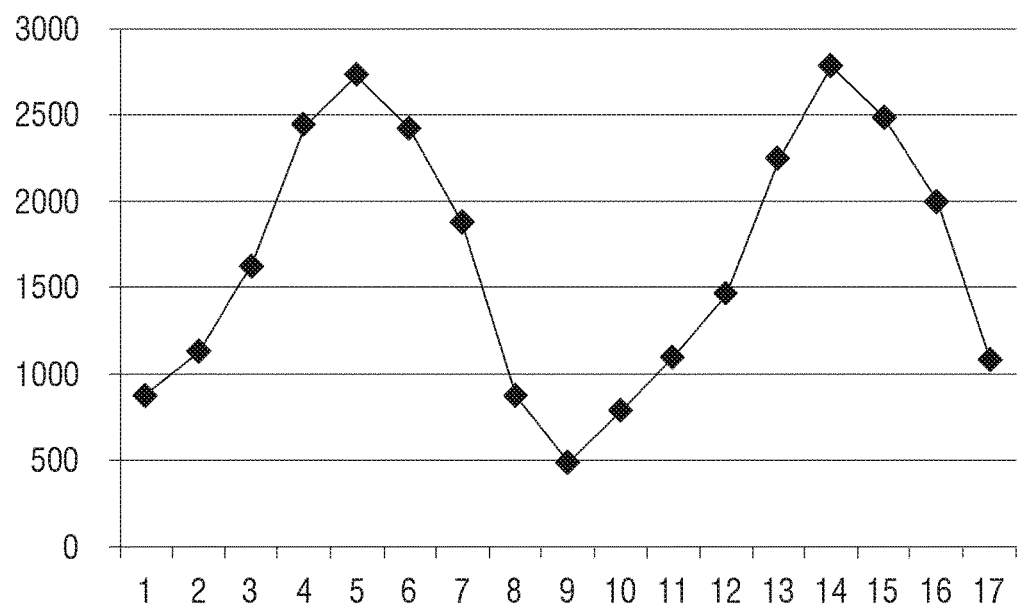
Figure 8A:
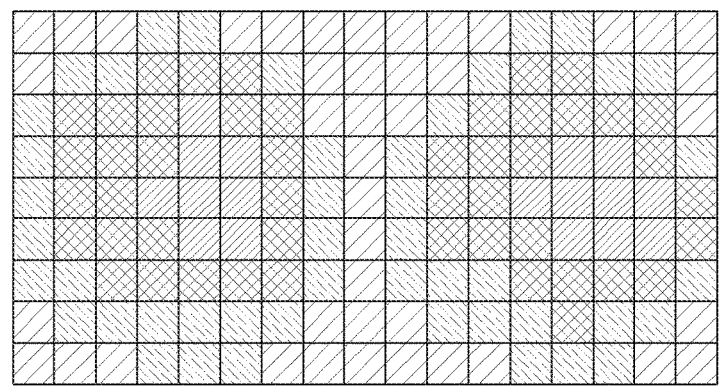
Figure 8B:
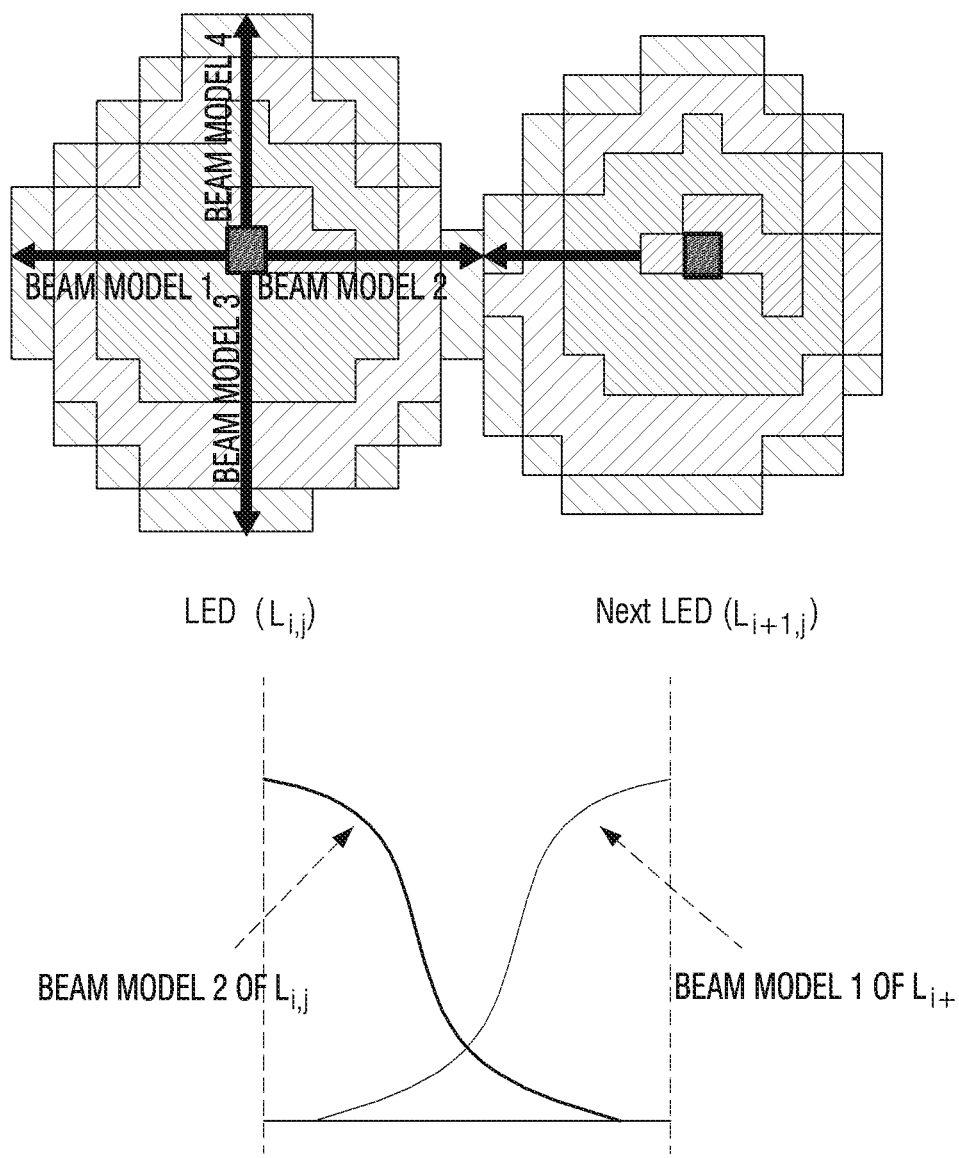

Thereafter, the processor 230 may model the degree of luminance interference between each pixel based on a Gaussian function corresponding to each pixel. For example, the processor 230 may model the degree of luminance interference between each pixel as illustrated in FIG. 8A (experiment data) and FIG. 8B (schematic data).

Figure 9A:
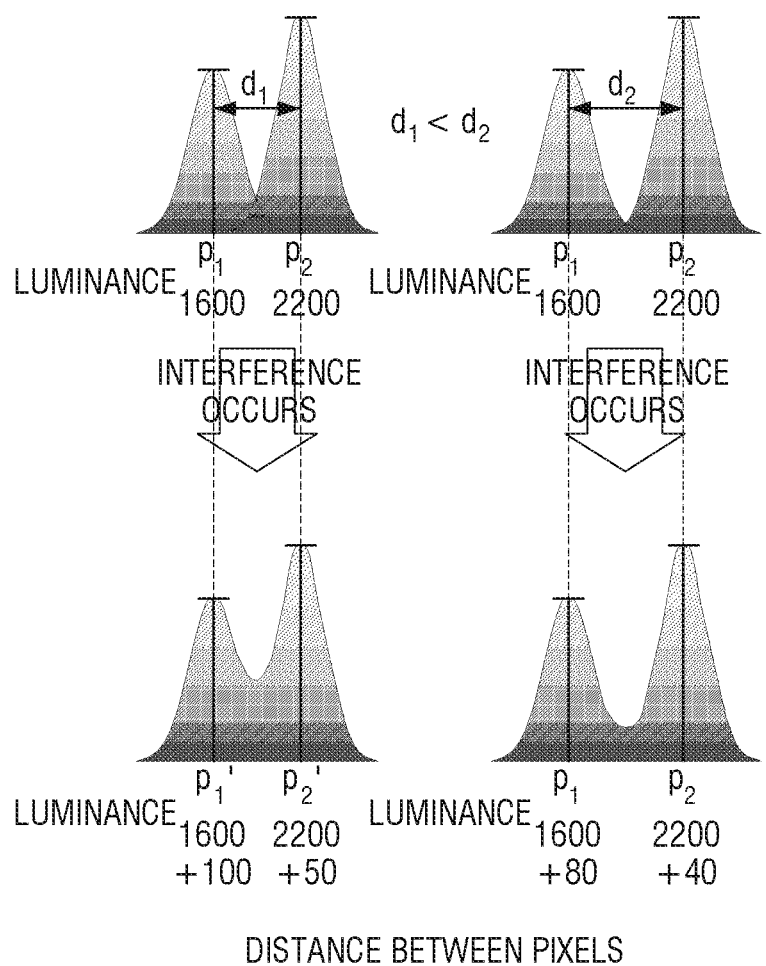

For example, the degree of luminance interference according to a distance between pixels may be modeled as illustrated in FIG. 9A. According to FIG. 9A, when a distance between pixels is d1, luminance interferences of +100 nit and +50 nit occur in the pixels P1 and P2, respectively, and when a distance between pixels is d2 (d1<d2), it can be understood that luminance interferences of +180 nit and +40 nit occur in the pixels P1 and P2, respectively. However, the numerical values are examples, and the example is not limited thereto.

Figure 9B:
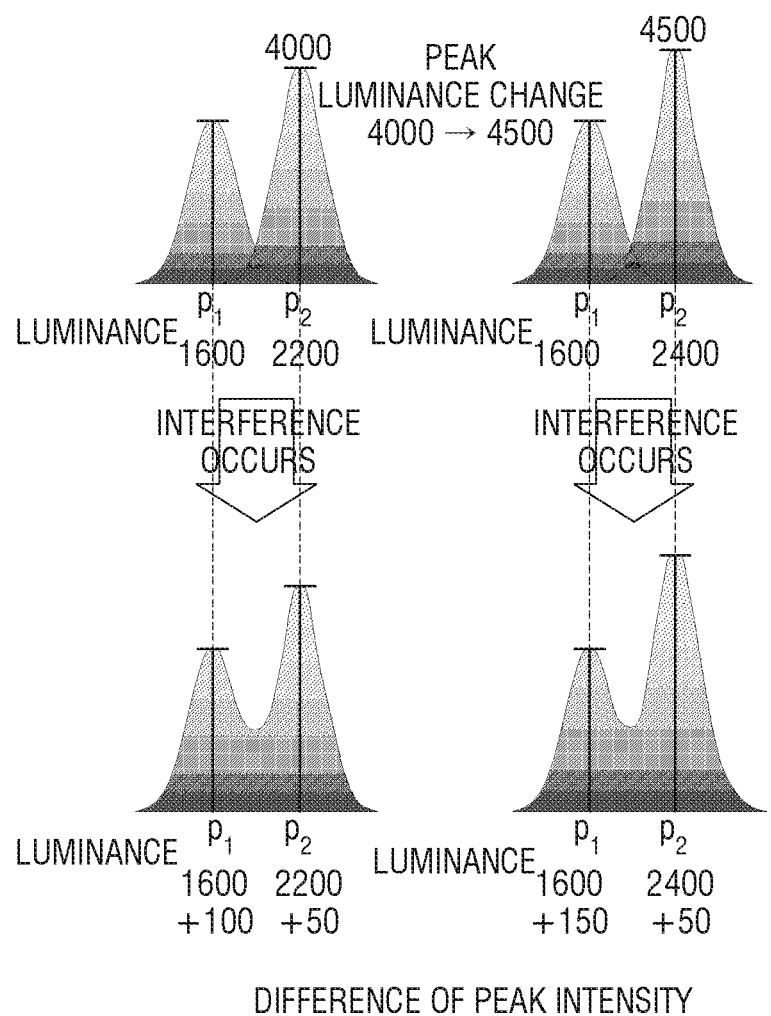

In a similar manner to the above-mentioned method, the degree of luminance interference according to a peak luminance value of adjacent pixel may be modeled as illustrated in FIG. 9B. According to FIG. 9B, it can be understood that when a peak luminance of an adjacent pixel is 4000, luminance interferences of +100 nit and +50 nit occur in the pixels P1 and P2, respectively, and that when a peak luminance of an adjacent pixel is 4500, luminance interferences of +150 nit and +50 nit occur in the pixels P1 and P2, respectively. However, the numerical values are examples, and the example is not limited thereto.

Figure 9C:
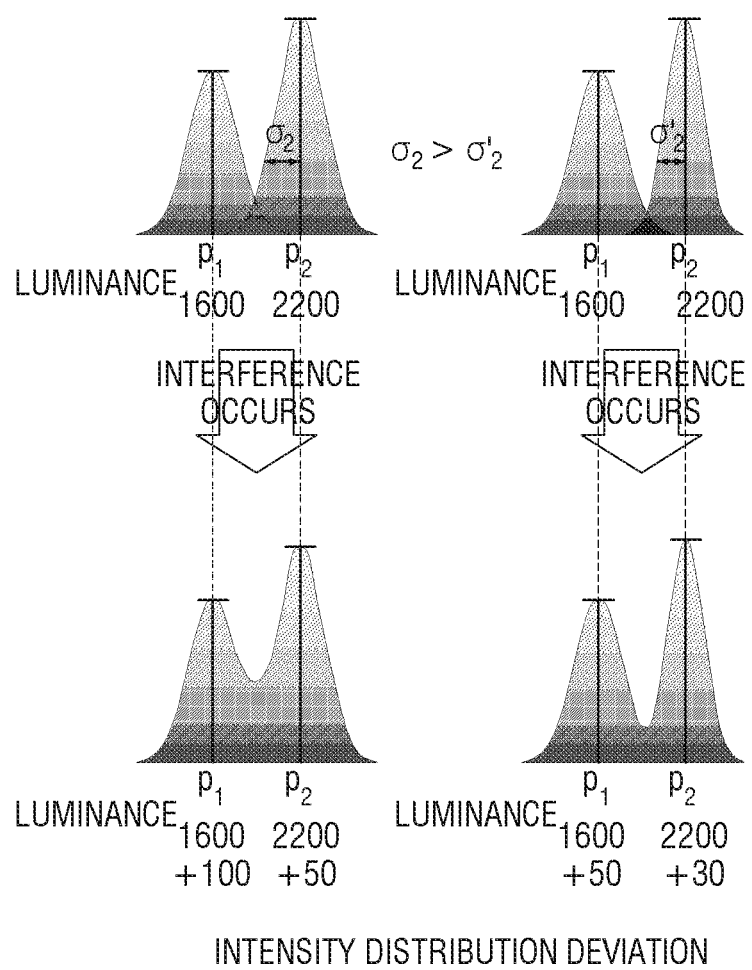

In a similar manner to the above-mentioned method, the degree of luminance interference according to a luminance distribution deviation of adjacent pixels may be modeled as illustrated in FIG. 9C. According to FIG. 9C, it can be understood that when a luminance distribution deviation of adjacent pixels is σ2, luminance interferences of +100 nit and +50 nit occur in the pixels P1 and P2, respectively, and that when a luminance distribution deviation of adjacent pixels is σ2', luminance interferences of +50 nit and +30 nit occur in the pixels P1 and P2, respectively. However, the numerical values are examples, and the example is not limited thereto.

Figure 9D:
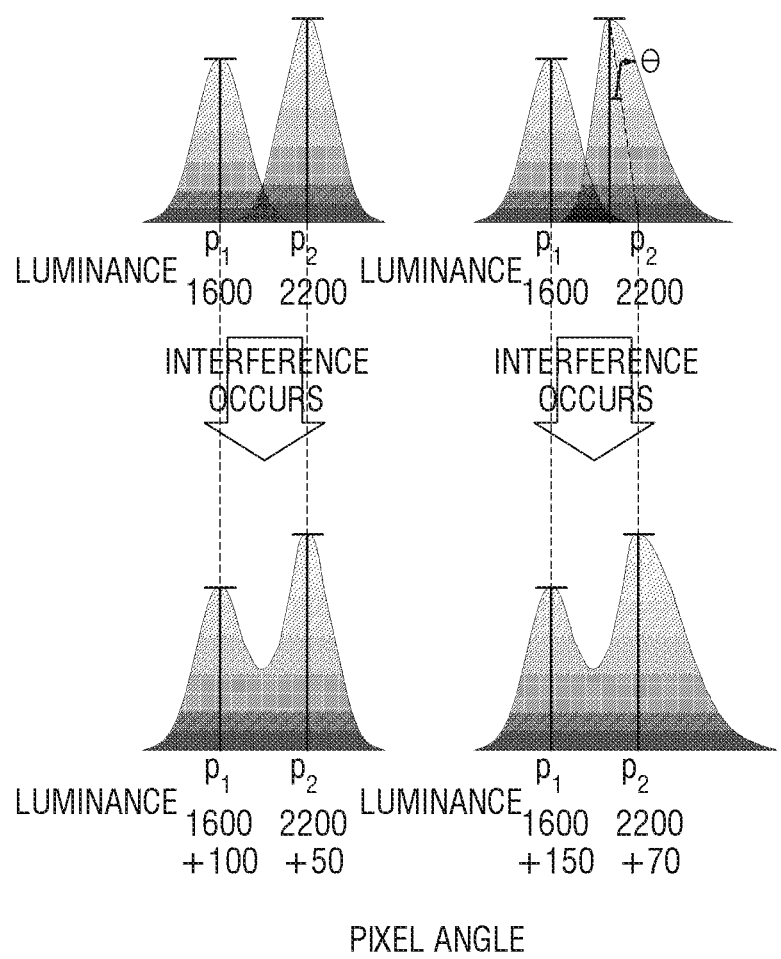

In a similar manner to the above-mentioned method, the degree of luminance interference according to an angle at which pixels are disposed may be modeled as illustrated in FIG. 9D. According to FIG. 9D, it can be understood that the degree of luminance interference differs depending on an inclination angle of pixels.

Thereafter, an actual luminance value of each pixel may be calculated based on the degree of luminance interference according to each interference factor, such as a distance between pixels, a peak luminance value of adjacent pixels, a luminance distribution deviation of adjacent pixels, and an angle at which pixels are disposed. In other words, an actual luminance value of each pixel may be calculated based on the measured luminance value based on a photographed image and the degree of luminance interference according to each interference factor.

Figure 10:
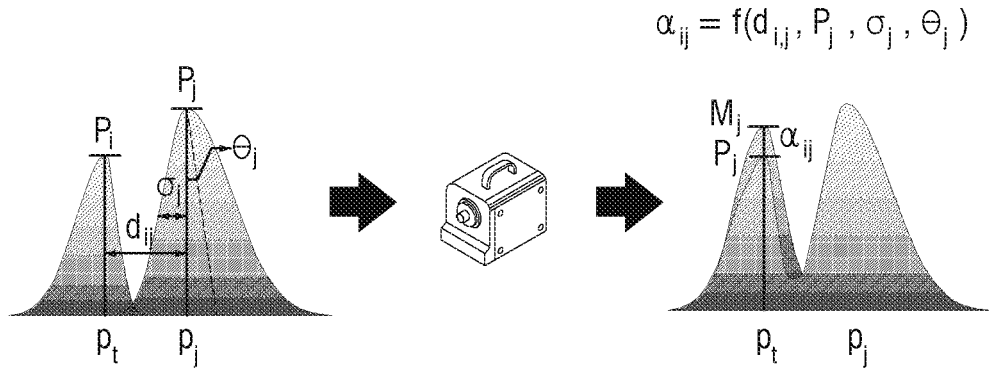

FIG. 10 illustrates a graph to model the degree of luminance interference by considering all of a peak luminance value of adjacent pixels, a luminance distribution deviation of adjacent pixels, and an angle at which pixels are disposed.

For example, when a distance between a j-th pixel and an i-th pixel is $d_{i,j}$, a luminance of the j-th pixel is $P_j$, a luminance deviation of the j-th pixel is $\sigma_j$, and an angle of the j-th pixel is $\theta_j$, the degree of interference affecting the j-th pixel, $\alpha_{i,j}$, may be expressed in Equation 3 as follows.

$$\alpha_{ij} = f(d_{i,j}, P_j, \sigma_j, \theta_j) \quad \text{[Mathematical formula 3]}$$

Accordingly, Equation 4 as follows, may be derived from the example embodiment illustrated in FIG. 5.

[Mathematical formula 4]
$$M_1 = P_1 + \sum_{j=1}^{N} \alpha_{1j} = P_1 + \sum_{j=1}^{N} f(d_{1,j}, P_j, \sigma_j, \theta_j)$$
$$M_2 = P_2 + \sum_{j=1}^{N} \alpha_{2j} = P_2 + \sum_{j=1}^{N} f(d_{2,j}, P_j, \sigma_j, \theta_j)$$
$$\ldots$$
$$M_N = P_N + \sum_{j=1}^{N} \alpha_{Nj} = P_N + \sum_{j=1}^{N} f(d_{N,j}, P_j, \sigma_j, \theta_j)$$

Accordingly, the luminance value of each pixel may be calculated by Equation 5 as shown below.

$$P_N = M_N - \sum_{j=1}^{N} f(d_{i,j}, P_j, \sigma_j, \theta_j) \quad \text{[Mathematical formula 5]}$$

When an actual luminance value of each pixel is calculated in this method, a correction coefficient for the actual luminance value of each pixel to have a second target value may be calculated.

When a correction coefficient of each pixel that reflects the degree of luminance interference mentioned above is calculated, compensation with respect to the correction coefficient may be performed to reduce a color step between each of the display modules. The reason why a color step occurs is that a calibration for correcting LED element is a point light source calibration, and the user recognizes color as a surface light source that reflects the interference by the point light sources.

Accordingly, to reflect the interference of the point light sources, a group of point light sources of each LED is processed as one surface light source in units of a predetermined size (for example, a module, a cabinet, an LED area of a predetermined size, or the like) to correct a color step.

Figure 11:
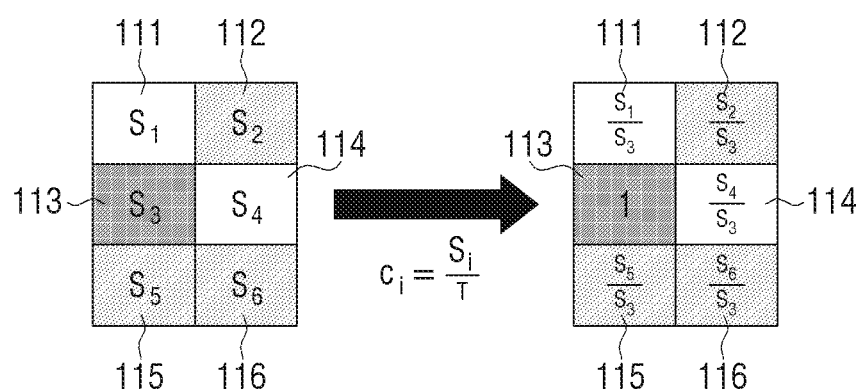
FIG. 11 is a diagram illustrating a method of eliminating a color step between modules according to an example embodiment.

FIG. 11 is a diagram illustrating a method of eliminating a color step between modules according to an example embodiment.

For example, as illustrated in FIG. 11, a representative value S1 to S6 of each of a plurality of display modules 111 to 116 may be calculated based on a photographed image, and a first target value may be determined based on the calculated representative value. For example, it is assumed that a representative luminance value having the lowest target value is set to S3.

In this case, a correction coefficient of a plurality of light emitting pixels included in each of the plurality of display modules 111 to 116 may be compensated based on the representative value S1 to S6 of each of the plurality of display modules 111 to 116 and the first target value S3. For example, a correction coefficient may be compensated by multiplying a correction coefficient of a plurality of light emitting pixels included in each of the plurality of display modules 111 to 116 by a compensation coefficient $c_i = S_i/T$, i.e., $c_i = S_i/S3$. Here, the correction coefficient may, as described above, be a correction coefficient calculated such that each pixel has a predetermined second target value for uniformity between pixels.

A compensation coefficient S1/S3 may be multiplied by a correction coefficient of each of a plurality of light emitting pixels included in a first display module 111, and a compensation coefficient S2/S3 may be multiplied by a correction coefficient of each of a plurality of light emitting pixels included in a second display module 112. Thereafter, a correction coefficient of a plurality of light emitting pixels included in third to sixth display modules 113 to 116 may be multiplied by compensation coefficients S3/S3=1. S4/S3, S5/S3 and S6/S3.

It has been described above based on luminance for the convenience of explanation. However, it has been mentioned that the calibration method according to the present disclosure may also be applied to calibration of color as well as luminance.

Figure 12:
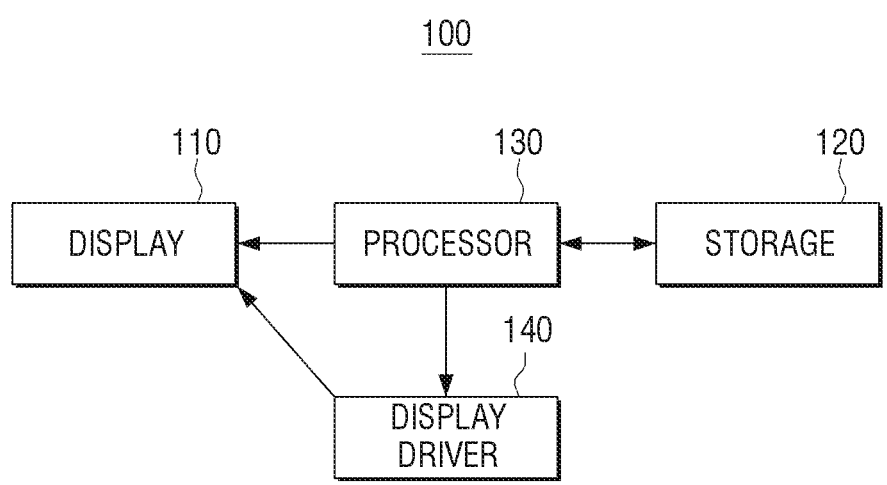
FIG. 12 is a block diagram illustrating a detailed operation of a display apparatus according to an example embodiment.

FIG. 12 is a block diagram illustrating a detailed operation of a display apparatus according to an example embodiment.

Referring to FIG. 12, the display apparatus 100 includes the display 110, the storage 120, the processor 130, and a display driver 140. The elements of FIG. 12 overlapped with the elements of FIG. 2 will not be specifically explained below.

The processor 130 may include a CPU, a ROM (or non-volatile memory) that stores a control program for controlling the display apparatus 100, and a RAM (or volatile memory) that stores data input from outside the display apparatus 100 or is used as a storage area corresponding to various operations performed in the display apparatus 100. The CPU is configured to access the storage 120 and perform booting using an operating system (OS) stored in the storage 120. In addition, various operations are performed using various programs, contents, and data stored in the storage 120.

The display driver 140 drives the display 110 according to a control of the processor 130. For example, the display driver 140 applies a driving voltage or drives a driving current to drive each self-luminous element, for example, LED pixel, included in the display 110 according to a control of the processor 130, to thereby drive each LED pixel.

When a correction coefficient is modified, to drive a target pixel area according to the modified correction coefficient, the processor may adjust a duty ratio of pulses (R_Pulse, G_Pulse, B_Pulse) input to at least one LED pixel corresponding to the target pixel area. For this purpose, the processor 130 may adjust a duty ratio of pulses (R_Pulse, G_Pulse, B_Pulse) according to the modified correction coefficient and output the pulses to the display driver 140 for driving a LED pixel. The display driver 140 may provide a driving current to the display 110 to correspond to each control signal input from the processor 130 to drive the display 110. In other words, the display 110 adjust a supply time or intensity of a driving current provided to each LED element to correspond to each of input driving signals, and output the driving current.

In this case, the display driver 140 may include a plurality of driving modules corresponding to each of a plurality of display modules, or may be implemented in the form of one driving module to drive all of the plurality of display modules. For example, the plurality of driving modules corresponding to each of the plurality of display modules may be formed as a plurality of semiconductor integrated chips (ICs), respectively.

According to circumstances, each of a plurality of display modules may be realized to include a sub processor for controlling an operation of each display module, and a driving module to drive each display module according to a control of the sub processor. In this case, each sub processor and driving module may be realized as a hardware, software, firmware or integrated chip (IC). According to an example embodiment, each sub processor may be realized as a separate semiconductor IC.

According to the example embodiments mentioned above, it is possible to provide a high-speed measurement method for reducing the number of times of shooting by the related-art spacing measurement. According to the example embodiments of the present disclosure, it is possible to reduce the color step between the display modules.

The methods according to the example embodiments of the present disclosure described above may be implemented by only software/hardware upgrade for an existing unit display module and/or a display apparatus including a unit display module.

Further, a non-transitory computer readable medium recording therein program to sequentially perform a calibration method according to example embodiments may be provided.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

For example, any one or any combination of these components, elements, modules or units may use a direct circuit structure, such as a memory, a processor, a logic circuit, a look-up table, etc. that may execute the respective functions through controls of one or more microprocessors or other control apparatuses.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A display apparatus comprising:
   a display comprising display modules, each of the display modules including light emitting pixels;
   a storage configured to store a correction coefficient for each of the light emitting pixels included in each of the display modules; and
   a processor configured to apply the correction coefficient for each of the light emitting pixels respectively to a pixel value of each of the light emitting pixels to correct the pixel value of each of the light emitting pixels,
   wherein the correction coefficient for each of the light emitting pixels is determined based on a first target value for reducing a color step between each of the display modules,
   wherein the first target value is determined based on one or more representative pixel values of the display modules,
   wherein the correction coefficient for each of the light emitting pixels is further determined by determining an actual pixel value of each of the light emitting pixels, based on a degree of interference between the light emitting pixels that are modeled based on a captured image of the display, and
   wherein the degree of interference between the light emitting pixels is modeled based on at least one of a distance between the light emitting pixels, a peak pixel value of the light emitting pixels, a light distribution deviation of the light emitting pixels and a disposition angle of the light emitting pixels.

2. The display apparatus as claimed in claim 1, wherein the pixel value represents either one or both of luminance and color.

3. The display apparatus as claimed in claim 1, wherein the correction coefficient for each of the light emitting pixels is determined by compensating a first correction coefficient by the first target value,
   wherein the first correction coefficient is determined so that the determined actual pixel value of each of the light emitting pixels to which the first correction coefficient is applied has a second target value that is set for uniformity between the light emitting pixels.

4. The display apparatus as claimed in claim 1, wherein the degree of interference between the light emitting pixels is modeled based on the distance between a target pixel and an adjacent pixel, among the modeled pixels, and the peak pixel value of the adjacent pixel.

5. The display apparatus as claimed in claim 1, wherein the degree of interference between the light emitting pixels is further modeled based on either one or both of the light distribution deviation between a target pixel and an adjacent pixel, among the light emitting pixels, and the disposition angle at which the target pixel and the adjacent pixel are disposed.

6. The display apparatus as claimed in claim 1, wherein each of the display modules is a light emitting diode (LED) module comprising LED pixels, or an LED cabinet to which LED modules are connected.

7. A calibration method of a display comprising display modules, the method comprising:
  modeling, by a processor of a calibration apparatus, a degree of interference between light emitting pixels included in each of the display modules, based on a captured image of the display;
  determining, by the processor, a correction coefficient for each of the light emitting pixels, based on the degree of interference that are modeled;
  determining, by the processor, a representative pixel value of each of the display modules, based on the captured image of the display;
  determining, by the processor, a first target value for reducing a color step between each of the display modules, based on the determined representative pixel value of each of the display modules;
  compensating, by the processor, the correction coefficient, based on the determined representative pixel value of each of the display modules and the determined first target value;
  wherein the correction coefficient is determined based on a second target value for uniformity between pixels, and
  wherein the degree of interference between the light emitting pixels is modeled based on at least one of a distance between the light emitting pixels, a peak pixel value of the light emitting pixels, a light distribution deviation of the light emitting pixels and a disposition angle of the light emitting pixels.

8. The calibration method as claimed in claim 7, wherein the modeling the degree of interference comprises:
  determining the distance between a target pixel and an adjacent pixel, among the light emitting pixels, and the peak value of the adjacent pixel; and
  modeling the degree of interference between the light emitting pixels, based on the determined distance and the determined peak pixel value, and
  wherein the determining the correction coefficient comprises:
  determining an actual pixel value of the target pixel, based on the modeled degree of interference; and
  determining the correction coefficient, based on the determined actual pixel value and the second target value.

9. The calibration method as claimed in claim 8, wherein the determining of the actual pixel value comprises determining the actual pixel value of the target pixel not interfering with the adjacent pixel, based on the determined degree of interference and a pixel value of the target pixel that is measured from the captured image, and
  wherein the determining of the correction coefficient comprises determining the correction coefficient so that the determined actual pixel value to which the correction coefficient is applied has the second target value.

10. The calibration method as claimed in claim 7, wherein the determining of the degree of interference comprises determining the degree of interference between the light emitting pixels, based on the light distribution deviation between a target pixel and an adjacent pixel.

11. The calibration method as claimed in claim 7, wherein the determining of the degree of interference comprises determining the degree of interference between the light emitting pixels, based on the disposition angle at which a target pixel and an adjacent pixel are disposed.

12. The calibration method as claimed in claim 7, wherein each of the display modules is a light emitting diode (LED) module comprising LED pixels, or an LED cabinet to which LED modules are connected.

13. A calibration apparatus comprising:
  a camera configured to capture an image of a display comprising display modules to generate a captured image;
  a storage configured to store the captured image; and
  a processor configured to:
    model a degree of interference between light emitting pixels included in each of the display modules, based on the captured image of the display;
    determine a correction coefficient for each of the light emitting pixels, based on the degree of interference that are modeled;
    determine a representative pixel value of each of the display modules, based on the captured image;
    determine a first target value for reducing a color step between each of the display modules, based on the determined representative pixel value of each of the display modules; and
    compensate the correction coefficient, based on the determined representative pixel value of each of the display modules and the determined first target value,
    wherein the correction coefficient is determined based on a second target value for uniformity between pixels, and
    wherein the degree of interference between the light emitting pixels is modeled based on at least one of a distance between the light emitting pixels, a peak pixel value of the light emitting pixels, a light distribution deviation of the light emitting pixels and a disposition angle of the light emitting pixels.

14. The calibration apparatus as claimed in claim 13, wherein the processor is further configured to:
  determine the distance between a target pixel and an adjacent pixel, among the light emitting pixels and the peak pixel value of the adjacent pixel;
  model the degree of interference between the light emitting pixels, based on the determined distance and the determined peak pixel value;
  determine an actual pixel value of the target pixel, based on the modeled degree of interference; and
  determine the correction coefficient, based on the determined actual pixel value and the second target value.

15. The calibration apparatus as claimed in claim 14, wherein the processor is further configured to:
  determine the actual pixel value of the target pixel not interfering with the adjacent pixel, based on the determined degree of interference and a pixel value of the target pixel that is measured from the captured image; and
  determine the correction coefficient so that the determined actual pixel value to which the correction coefficient is applied has the second target value.

16. The calibration apparatus as claimed in claim 13, wherein the processor is further configured to determine the degree of interference between the light emitting pixels, based on the light distribution deviation between a target pixel and an adjacent pixel.

17. The calibration apparatus as claimed in claim 13, wherein the processor is further configured to determine the degree of interference between the light emitting pixels, based on the disposition angle at which a target pixel and an adjacent pixel are disposed.

18. The calibration apparatus as claimed in claim 13, wherein each of the display modules is an LED module comprising LED pixels, or an LED cabinet to which LED modules are connected.

* * * * *